United States Patent
Strobel

[11] 3,879,443
[45] Apr. 22, 1975

[54] SUN-SCREENING COMPOUNDS AND COMPOSITIONS—III
[75] Inventor: Albert Frederick Strobel, Delmar, N.Y.
[73] Assignee: GAF Corporation, New York, N.Y.
[22] Filed: Apr. 29, 1974
[21] Appl. No.: 465,258

[52] U.S. Cl................ 260/472; 260/473 B; 424/60
[51] Int. Cl............................................. C07c 101/72
[58] Field of Search........................ 260/472, 473 R

[56] References Cited
UNITED STATES PATENTS
3,536,723  10/1970  Ghelardoni et al.................. 260/472

Primary Examiner—Lorraine A. Weinberger
Assistant Examiner—L. A. Thaxton
Attorney, Agent, or Firm—Walter C. Kehm; Samson B. Leavitt

[57] ABSTRACT

Sun-screening compounds, useful to protect the skin and hair against deleterious effects upon exposure to ultraviolet radiation, of the formula:

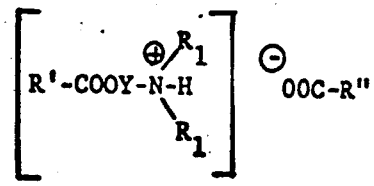

where R' is

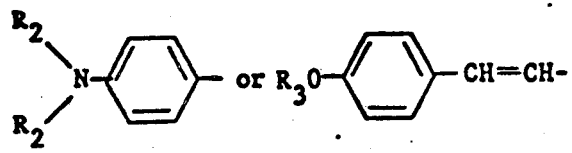

R'' is

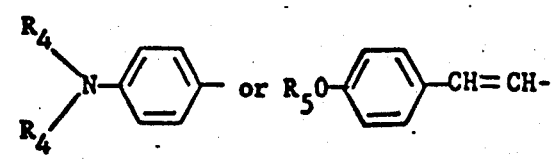

$R_1$, $R_2$, $R_3$, $R_4$ and $R_5$ are independently lower alkyl and Y is a $C_2$-$C_6$ alkylene.

Sun-screening compositions containing such compounds and a cosmetically acceptable diluent or carrier, and methods of using such compositions, are also disclosed.

7 Claims, No Drawings

SUN-SCREENING COMPOUNDS III

The present invention relates to sun-screening compositions, methods of using the same and novel sun-screening compounds.

Ultraviolet radiation on the skin, such as from the sun, of a wavelength of 290 – 313 $\mu$ is known to produce erythema, particularly in fair skinned subjects. On the other hand, ultraviolet radiation of from 315 – 320 $\mu$ to 350 – 400 $\mu$ promotes a tanning of the skin. To be effective, a sun-screening composition must remove substantially all of the burning rays, while transmitting the tanning rays.

It is, therefore, an object of this invention to provide novel sun-screening compounds that are effective to prevent erythema.

It is a further object of the invention to provide new sun-screening compositions containing the sun-screening compounds of the invention.

These objects are provided by the provision of a sun-screening compound of formula (I):

(I) $\left[ R'-COOY-\overset{\oplus}{\underset{\underset{R_1}{|}}{N}}-H \right]$  $\overset{\ominus}{OOC}-R''$ where
R' is

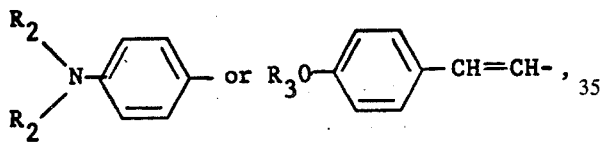

R'' is

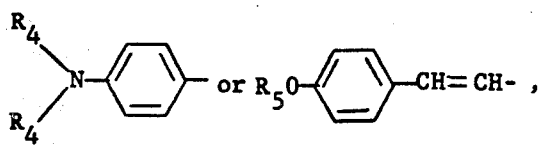

$R_1$, $R_2$, $R_3$, $R_4$ and $R_5$ are independently lower alkyl and Y is a $C_2$-$C_6$ alkylene.

Such compounds show sharp absorption of ultraviolet light in the range of 290 – 315 $\mu$, minimum absorption of ultraviolet light in the range of 316 – 400 $\mu$, and have good substantivity on the skin.

The term lower alkyl denotes a univalent saturated branched or straight hydrocarbon chain containing from 1 to 6 carbon atoms. Representative of such lower alkyl groups are thus methyl, ethyl, propyl, isopropyl, butyl, isobutyl, sec. butyl, tert. butyl, pentyl, isopentyl, neopentyl, tert. pentyl, hexyl, and the like. The term alkylene of 2 to 6 carbon atoms denotes a divalent saturated straight or branched hydrocarbon obtained by removing a hydrogen atom from the lower alkyl defined above, excluding methyl.

In a preferred embodiment of the invention, $R_1$ through $R_5$ are independently $C_1$-$C_3$ straight or branched chain alkyl.

Compounds of formula (I) are salts which are prepared by reacting approximately equimolar amounts of a cationic sun-screening compound of formula (II) or (III) with an anionic sun-screening compound of formula (IV) or (V) at about 80°–120°C without a solvent for about 30 – 60 minutes until a clear liquid results, according to process A below. On cooling a glass-like composition is obtained.

(A)

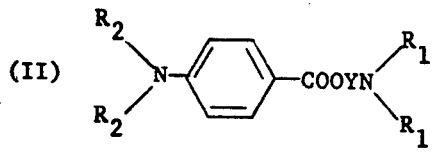

or

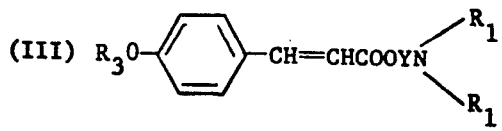

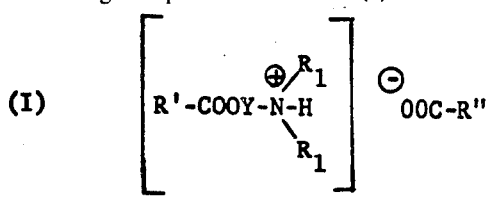

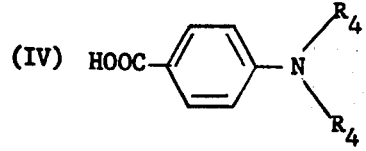

or

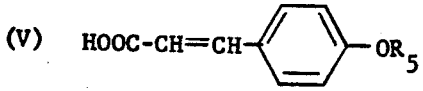

where Y and $R_1$ through $R_5$ are as defined above.

Both the cationic (II) and (III) and the anionic (IV) and (V) sun-screening compounds used to form the salt (I) have maximum absorptions within the range of 300 – 310 $\mu$ with low absorptions at about 340 $\mu$. Thus both individually filter out the damaging sun-burning rays but not the less damaging rays which allow tanning without burning. Surprisingly, the UV absorption properties of the reactants (II) or (III) and (IV) or (V) are additive, and the salt of formula (I) formed therefrom has absorptive powers approximately equivalent to the sum of the absorptive properties of the two reactants in the range of maximum absorption, i.e. the burning rays, and very low absorption in the range where tanning can occur without burning.

While many sun-screening compounds are known, their structural formulas are widely diverse. For example, known sun-screening compounds include dibenzylacetone, quinine sulfate and ethyl umbelliferone. German Pat. No. 957,162 proposes the use of dialkylaminoalkyl esters of p-methoxycinnamic acid as sun-screening compounds. Alkyl esters of p-dialkylaminobenzoic acid have also been proposed for use as sun-screening agents in U.S. Pat. Nos. 2,853,423; 3,403,207; and 3,479,428. However, so far as we are aware, there has been no proposal in the prior art of a salt formed of two sun-screening compounds. In view of this, and the highly empirical nature of the ability of a compound selectively to absorb ultraviolet radiation in the narrow range of 290 to 310 $\mu$, it could not be predicted that the salts of formula (I) would be useful as sun-screening agents.

Dialkylaminoalkyl esters of dialkylaminobenzoic acid are proposed in U.S. Pat. No. 820,830, but such compounds are strong bases (pH 11-12 in aqueous solution) and hence would be too irritating and harmful to the eyes and skin for application to the skin or hair. The hydrochloride salt of diethylaminoethyl p-dimethylaminobenzoate is described as a local anesthetic in Chem. Abstracts, 63:1657c. So far as we are aware, the salts of formula (I) are novel.

The p-dialkylaminobenzoic acid (IV) and p-alkoxycinnamic acid (V) are also known.

Representative compounds (II) and (III) which may be used in process (A) are:
a. dimethylaminoethyl ester of p-dimethylaminobenzoic acid or of p-methoxycinnamic acid.
b. dimethylaminoethyl ester of p-diethylaminobenzoic acid or of p-ethoxycinnamic acid.
c. dimethylaminobutyl ester of p-diethylaminobenzoic acid or of p-ethoxycinnamic acid.
d. dimethylaminohexyl ester of p-diethylaminobenzoic acid or of p-ethoxycinnamic acid.
e. diethylaminoethyl ester of p-dimethylaminobenzoic acid or of p-methoxycinnamic acid.
f. dihexylaminoethyl ester of p-dimethylaminobenzoic acid or of p-methoxycinnamic acid.
g. dimethylaminoethyl ester of p-dihexylaminobenzoic acid or of p-hexoxycinnamic acid.

Representative compounds (IV) and (V) which may be used in process (A) are:
a. p-dimethylaminobenzoic acid or p-methoxycinnamic acid.
b. p-diethylaminobenzoic acid or p-ethoxycinnamic acid.
c. p-di-isopropylaminobenzoic acid or p-isopropoxycinnamic acid.
d. dibutylaminobenzoic acid or p-butoxycinnamic acid.
e. p-dihexylaminobenzoic acid or p-hexoxycinnamic acid.

Representative compounds of formula (I) are:
1. N,N-dimethyl-N-(diethylaminobenzoyloxyethyl)-ammonium p-dihexylaminobenzoate or p-hexoxycinnamate.
2. N,N-diethyl-N-(p-dimethylaminobenzoyloxyethyl)-ammonium p-dimethylaminobenzoate or p-methoxycinnamate.
3. N,N-dimethyl-N-(p-diethylaminobenzoyloxyethyl)-ammonium p-diethylaminobenzoate or p-ethoxycinnamate.
4. N,N-dimethyl-N-(p-diethylaminobenzoyloxybutyl)-ammonium p-diisopropylaminobenzoate or p-isopropoxycinnamate.
5. N,N-dimethyl-N-(p-dimethylaminobenzoyloxyhexyl)-ammonium p-dibutylaminobenzoate or p-butoxycinnamate.
6. N,N-dihexyl-N-(p-dimethylaminobenzoyloxyethyl)-ammonium p-methylaminobenzoate or p-methoxycinnamate.
7. N,N-dimethyl-N-(p-methoxycinnamoyloxyethyl)-ammonium p-diethylaminobenzoate or p-ethoxycinnamate.
8. N,N-dimethyl-N-(p-butoxycinnamoyloxyethyl)-ammonium p-diethylaminobenzoate or p-ethoxycinnamate.
9. N,N-dihexyl-N-(p-hexoxycinnamoyloxyethyl)-ammonium p-diethylaminobenzoate or p-ethoxycinnamate.
10. N,N-diethyl-N-(p-methoxycinnamoyloxyhexyl)-ammonium p-dimethylaminobenzoate or p-methoxycinnamate.

The sun-screening agents of formula (I) are applied to the skin in the form of a sun-screen composition comprising the compound of formula (I) and a cosmetically acceptable diluent or carrier. The term "cosmetically acceptable diluent or carrier" denotes a non-toxic, non-irritating substance which when mixed with the compound of formula (I) makes the compound more suitable to be applied to the skin. The compositions can thus be solutions, oils, lotions, ointments, liquid or solid creams, aerosols and the like.

The sun-screening composition of the invention is formed by admixing, dissolving or dispersing the sun-screening compound of formula (I) into the desired cosmetically acceptable diluent or carrier. Since the compounds are not water-soluble, solutions are formed by dissolving the sun-screening compound in solvents, such as lower alcohols, glycols, lower alkoxyalkanols, N-methylpyrrolidone, dimethylformamide and the like. Oils are prepared by using vegetable and/or mineral oils, such as sesame oil and/or white mineral oil as the cosmetically acceptable diluent or carrier. Creams may be prepared by adding lanolin and a suitable absorbent base to the vegetable and/or mineral oils. Oil-in-water emulsions may be employed as the vehicle to form lotions, but are not preferred since such compositions tend to wash off more easily than others.

An alcoholic lotion containing a lower alcohol, such as ethanol or isopropanol, and a film-forming substance as the cosmetically acceptable diluent or carrier is preferred, since this tends to provide more permanent protection even after exposure of the skin to water. Preferred film-forming agents for alcholic lotions are castor oil, lauryl and oleyl alcohols, glycol and glyceryl ricinoleates, glycol and glyceryl laurates, glycol and glyceryl oleates, mannitol and sorbitol oleate, laurate, or ricinoleate, butyl stearate, ethyl oleate, laurate, or ricinoleate and methyl oleate, laurate or ricinoleate.

Perfumes, anti-oxidants, colorants, insect-repellents and the like may be included in the sun-screening composition, if desired.

The sun-screening composition of the invention contains an effective amount of the sun-screening compound of formula (I) to prevent erythema. In general, an amount of 1 to 10 percent, preferably 1-3 percent, by weight of the total composition, of the sun-screening compound of formula (I) may be used. The composition is applied topically every few hours, as needed, in the same manner as conventional sun-screening compositions.

The compounds of the invention may also be used to protect blond and light-colored hair from the deleterious effects of ultraviolet radiation. In this case, the compounds of formula (I) are admixed with the cosmetically acceptable diluent or carrier to provide a composition containing from 0.05 to 10 percent by weight, preferably 2 to 5 percent by weight, of the compound of formula (I). The hair-protection compositions are applied to the hair in the same manner as a conventional hair lotion, hair cream or hair tonic, before exposure to ultraviolet radiation, and thereafter as desired. Cosmetically acceptable diluents or carriers used in such conventional hair preparations may be used in the hair-protection composition of the invention.

In the Examples, the following procedures were used:

Test Procedure on Skin

Reference solutions of the candidate compound in 50/50 ethanol-water solvent are prepared in concentrations of 2 percent by weight and below. Such solutions are applied to the skin and dried in air. Examination of the treated section of skin under UV light reveals a bluish-white color for untreated skin and brownish-black to black color for treated skin.

A 2 percent by weight solution of the candidate compound in 50 percent ethanol-50 percent water is then rubbed into the skin, dried in air, and part of the air-dried surface is rinsed with water for two minutes. Examination of the rinsed and unrinsed sections of skin was then made in UV (black) light. The retention of the UV absorber on the skin is determined by observing the color of the treated and untreated sections under UV light and comparing the color to the reference solutions.

Tests for sunburn protection are carried out by applying a 2 percent by weight solution of the candidate compound in 50 percent ethanol-50 percent water to a small patch of skin, followed by exposure to sun for two hours. To be successful, a compound must prevent erythema after exposure for two hours to the sun at a latitude of New York City.

Test Procedure for Hair

The substantivity of the candidate compound to hair is tested in the following manner. The candidate compound is dissolved in 100 mls. of water to provide an 0.1 percent by weight aqueous solution. 10 gms. of hair is immersed in the resulting aqueous solution, stirred for one-half hour, removed, rinsed and dried. The UV absorption of the aqueous solution into which the hair was immersed is measured both before and after the immersion of the hair in the solution using the same technique described above. The percent of the compound left after rinsing determines the amount of substantivity.

The following examples illustrate the invention. Parts and percentages are by weight unless otherwise stated.

EXAMPLE 1

Preparation and application to the skin of:

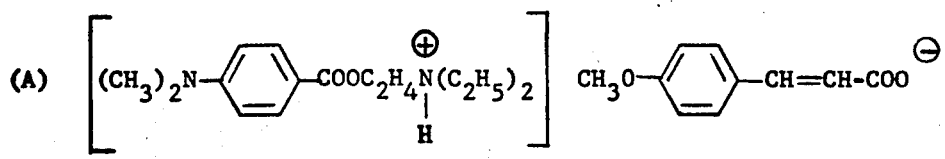

Equimolar amounts of diethylaminoethyl ester of p-dimethylaminobenzoic acid and of p-methoxycinnamic acid were mixed and heated together with stirring until a clear solution resulted. On cooling, it solidified in a glassy form containing compound (A).

A 5 percent solution of compound (A) in a 50 percent alcohol-water solution was applied to the skin as a spray or a lotion. On drying, a light film of agent remained on the skin and offered excellent protection against sun-burn caused by the deleterious rays of the sun, but allowed tanning to occur. Even after rinsing off of the skin, the composition afforded protection due to its substantivity to the skin and absence of washing off.

When applied to the hair as a hair spray, hair did not discolor on exposure to UV radiation.

This salt has a $K_{max} = 112$ at 308 $\mu$ whereas $K_{max}$ of the individual moieties are 313 $\mu$ and 310 $\mu$, respectively.

EXAMPLE 2

Preparation and application to the skin of:

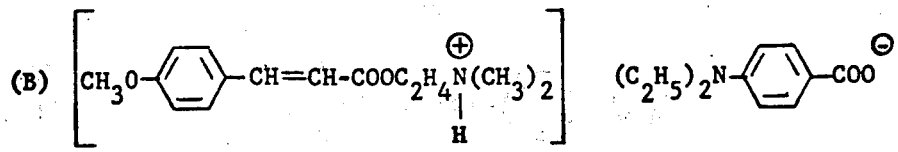

In the same manner as Example 1, equimolar amounts of the dimethylaminoethyl ester of p-methoxycinnamic acid and p-diethylaminobenzoic acid were mixed and heated to 100°C until a clear solution was produced. It glassified on cooling and contained compound (B). A 5 percent solution of compound (B) in a 50–50 water-alcohol resulted in a product capable of protecting skin against sun-burn while still allowing tanning.

EXAMPLES 3–5

The following salts were produced using the procedure of Example 1. These salts had similar properties as compound (A).

EXAMPLE 3

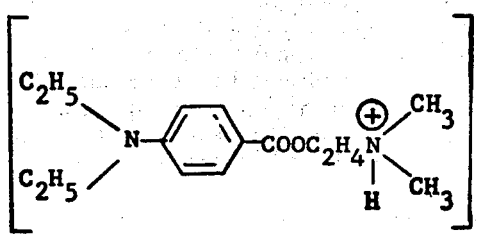

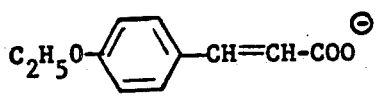

EXAMPLE 4

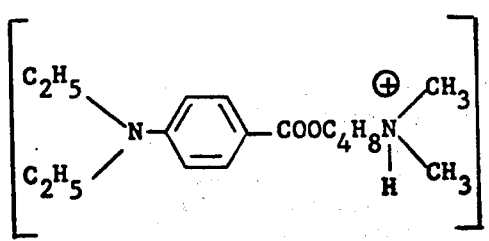

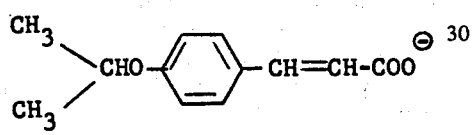

EXAMPLE 5

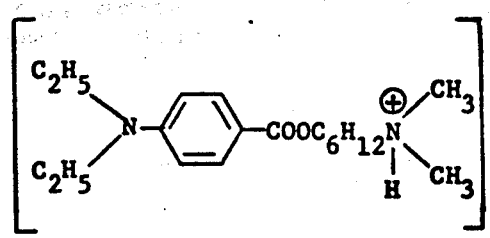

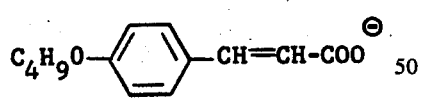

I claim:
1. A compound of the formula:

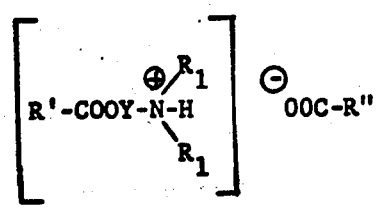

where
R' is

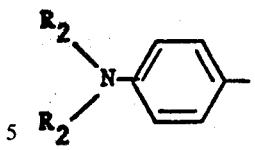 or

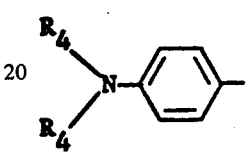 ,

R'' is

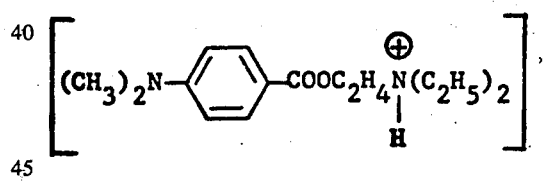 or

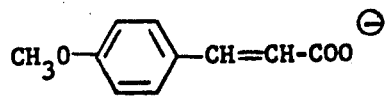 , $R_1$, $R_2$, $R_3$, $R_4$ and $R_5$ are independently lower alkyl and Y is a $C_2$-$C_6$ alkylene.

2. The compound according to claim 1, wherein $R_1$, $R_2$, $R_3$, $R_4$ and $R_5$ are independently straight or branched chain alkyl of 1 to 3 carbon atoms.

3. The compound according to claim 1, which is

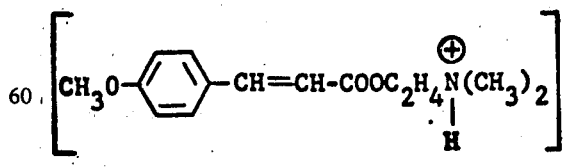

4. The compound according to claim 1, which is

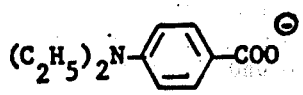

5. The compound according to claim 1, which is
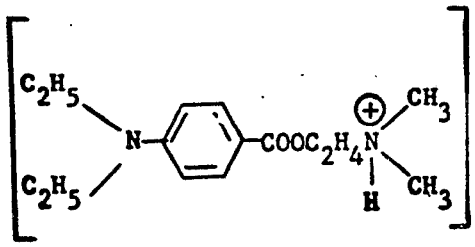
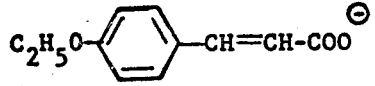
6. The compound according to claim 1, which is
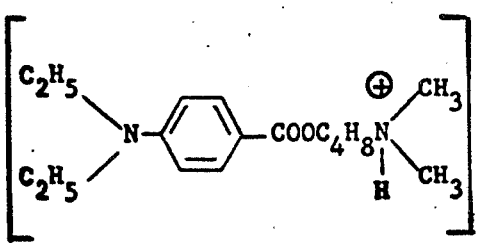
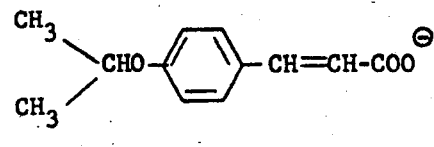
7. The compound according to claim 1, which is
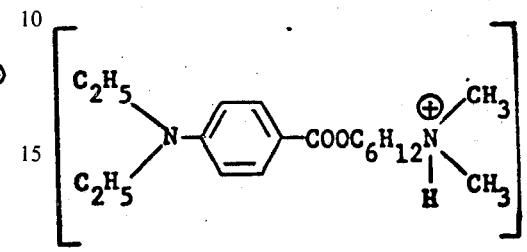
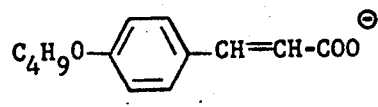
* * * * *